United States Patent
Jiang et al.

(10) Patent No.: US 12,301,798 B2
(45) Date of Patent: May 13, 2025

(54) METHOD, CODEC DEVICE FOR INTRA FRAME AND INTER FRAME JOINT PREDICTION

(71) Applicant: ZHEJIANG DAHUA TECHNOLOGY CO., LTD., Hangzhou (CN)

(72) Inventors: Dong Jiang, Hangzhou (CN); Jucai Lin, Hangzhou (CN); Jun Yin, Hangzhou (CN); Feiyang Zeng, Hangzhou (CN); Cheng Fang, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 340 days.

(21) Appl. No.: 17/676,792

(22) Filed: Feb. 21, 2022

(65) Prior Publication Data
US 2022/0217337 A1   Jul. 7, 2022

Related U.S. Application Data

(63) Continuation of application No. PCT/CN2020/110633, filed on Aug. 21, 2020.

(30) Foreign Application Priority Data

Aug. 21, 2019   (CN) .......................... 201910775395.5

(51) Int. Cl.
*H04N 19/11* (2014.01)
*H04N 19/105* (2014.01)
(Continued)

(52) U.S. Cl.
CPC ........... *H04N 19/11* (2014.11); *H04N 19/105* (2014.11); *H04N 19/159* (2014.11); *H04N 19/176* (2014.11)

(58) Field of Classification Search
CPC .... H04N 19/176; H04N 19/11; H04N 19/105; H04N 19/159
See application file for complete search history.

(56) References Cited

U.S. PATENT DOCUMENTS

2008/0310506 A1   12/2008   Xu et al.
2018/0278942 A1   9/2018   Zhang et al.
(Continued)

FOREIGN PATENT DOCUMENTS

CN   102006481 A   4/2011
CN   102215392 A   10/2011
(Continued)

OTHER PUBLICATIONS

International search report and Written Opinion of the International Search Authority, International Application No. PCT/CN2020/110633, mailed Nov. 27, 2019 (9 pages).
(Continued)

*Primary Examiner* — On S Mung

(57) ABSTRACT

An intra frame and inter frame joint prediction method is provided. The method includes determining at least one joint intra frame prediction mode of current coding block based on intra frame prediction mode of at least one encoded block of current frame, or determining the at least one joint intra frame prediction mode of the current coding block based on content characteristics of the current coding block, or taking at least one first specified intra frame prediction mode as the at least one joint intra frame prediction mode of current coding block; obtaining a joint intra frame prediction value of the current coding block based on the at least one joint intra frame prediction mode; and obtaining at least one intra frame and inter frame joint prediction value based on at least one candidate motion vector and the joint intra frame prediction value of the current coding block.

13 Claims, 5 Drawing Sheets

(51) Int. Cl.
*H04N 19/159* (2014.01)
*H04N 19/176* (2014.01)

(56) References Cited

U.S. PATENT DOCUMENTS

| | | | |
|---|---|---|---|
| 2018/0376148 | A1 | 12/2018 | Zhang et al. |
| 2019/0222837 | A1 | 7/2019 | Lee et al. |

FOREIGN PATENT DOCUMENTS

| | | | |
|---|---|---|---|
| CN | 102843559 | A | 12/2012 |
| CN | 102857750 | A | 1/2013 |
| CN | 107113425 | A | 8/2017 |
| CN | 110519600 | A | 11/2019 |
| WO | WO2017043816 | A1 | 3/2017 |
| WO | WO2019078629 | A1 | 4/2019 |

OTHER PUBLICATIONS

Chinese First Office Action, Chinese Application No. 201910775395.5, mailed Mar. 25, 2021 (22 pages).
Chinese Second Office Action, Chinese Application No. 201910775395.5, mailed Oct. 29, 2021 (19 pages).
"Test Model 3 of Versatile Video Coding (VTM 3)", 124. MPEG Meeting; Oct. 8-Oct. 12, 2018; Macao; (Motion Picture Expert Group or ISO/IEC JTC1/SC29/WG11),No. n18028 Jan. 14, 2019, XP030215596(48 pages).
Li J et al: "CE10-related: MPM list alignment between CUP and intra mode", 13. JVET Meeting; Jan. 9-Jan. 18, 2019;Marrakech; (The Joint Video Exploration Team of ISO/IEC JTC1/SC29/WG11 and ITU-T SG.16 ),No. JVET-M0276 Jan. 6, 2019 , XP030200798(3 pages).
European Search Report, EP20853858.7 , mailed Sep. 28, 2022(18 pages).
European examination opinion, EP20853858.7 , mailed Jan. 17, 2023(18 pages).

METHOD, CODEC DEVICE FOR INTRA FRAME AND INTER FRAME JOINT PREDICTION

CROSS-REFERENCE TO RELATED APPLICATIONS

This present disclosure is a continuation-application of International (PCT) Patent Application No. PCT/CN2020/110633 filed on Aug. 21, 2020, which claims priority to Chinese Patent present disclosure No. 201910775395.5, filed on Aug. 21, 2019, the contents of which are herein incorporated by reference in their entireties.

TECHNICAL FIELD

The present disclosure relates to the field of video coding-decoding technology, and in particular, to a method and a codec device for intra frame and inter frame joint prediction.

BACKGROUND

Because the large amount of video image data, it is usually necessary to compress video pixel value (RGB, YUV, etc.) to reduce the amount of video data. The compressed video pixel value is called video stream. The video stream is transmitted to the user through wired or wireless network, and then decoded to watch, which can decrease the network bandwidth in the transmission process and reduce storage space.

The whole video coding process comprises prediction, transformation, quantization, coding and so on. Prediction is divided into two parts with intra frame prediction and inter frame prediction. The intra frame prediction is used to remove the spatial redundancy of video images. The inter frame prediction is used to remove the temporal redundancy of video images. The intra frame prediction uses spatial correlation within an image frame to compress the image. The inter frame prediction uses temporal correlation between image frames to compress the image. During the long-term research and development process, the inventors of the present disclosure found that the intra frame and inter frame joint prediction is usually used in the prediction process of video image data. There are still certain deficiencies in intra frame and inter frame joint prediction technology, which also affects the accuracy of prediction to a certain extent.

SUMMARY

The technical problem mainly solved by the disclosure is to provide a method, a codec device for intra frame and inter frame joint prediction, and a device with storage function.

To solve the above technical problem, a technical scheme adopted by the present disclosure is to provide an intra frame and inter frame joint prediction method, the method includes: determining at least one joint intra frame prediction mode of current coding block based on intra frame prediction mode of at least one encoded block of current frame, or determining the at least one joint intra frame prediction mode of the current coding block based on content characteristics of the current coding block, or taking at least one first specified intra frame prediction mode as the at least one joint intra frame prediction mode of current coding block; obtaining a joint intra frame prediction value of the current coding block based on the at least one joint intra frame prediction mode; and obtaining at least one intra frame and inter frame joint prediction value based on at least one candidate motion vector and the joint intra frame prediction value of the current coding block.

To solve the above technical problem, another technical scheme adopted by the present disclosure is to provide a codec device. The codec includes a processor and a non-transitory program storage medium coupled to the processor. The non-transitory program storage medium is configured to store a program, and the processor is configured to execute the program to perform: determining at least one joint intra frame prediction mode of current coding block based on intra frame prediction mode of at least one encoded block of current frame, or determining the at least one joint intra frame prediction mode of the current coding block based on content characteristics of the current coding block, or taking at least one first specified intra frame prediction mode as the at least one joint intra frame prediction mode of current coding block; obtaining a joint intra frame prediction value of the current coding block based on the at least one joint intra frame prediction mode; and obtaining at least one intra frame and inter frame joint prediction value based on at least one candidate motion vector and the joint intra frame prediction value of the current coding block.

To solve the above technical problem, another technical scheme adopted by the present disclosure is to provide a non-transitory storage medium storing instructions, when executed, causing a processor to perform: determining at least one joint intra frame prediction mode of current coding block based on intra frame prediction mode of at least one encoded block of current frame, or determining the at least one joint intra frame prediction mode of the current coding block based on content characteristics of the current coding block, or taking at least one first specified intra frame prediction mode as the at least one joint intra frame prediction mode of current coding block; obtaining a joint intra frame prediction value of the current coding block based on the at least one joint intra frame prediction mode; and obtaining at least one intra frame and inter frame joint prediction value based on at least one candidate motion vector and the joint intra frame prediction value of the current coding block.

BRIEF DESCRIPTION OF THE DRAWINGS

In order to make the technical solution described in the embodiments of the present disclosure more clearly, the drawings used for the description of the embodiments will be briefly described. Apparently, the drawings described below are only for illustration, but not for limitation. It should be understood that, one skilled in the art may acquire other drawings based on these drawings, without making any inventive work.

DETAILED DESCRIPTION

Figure 1:
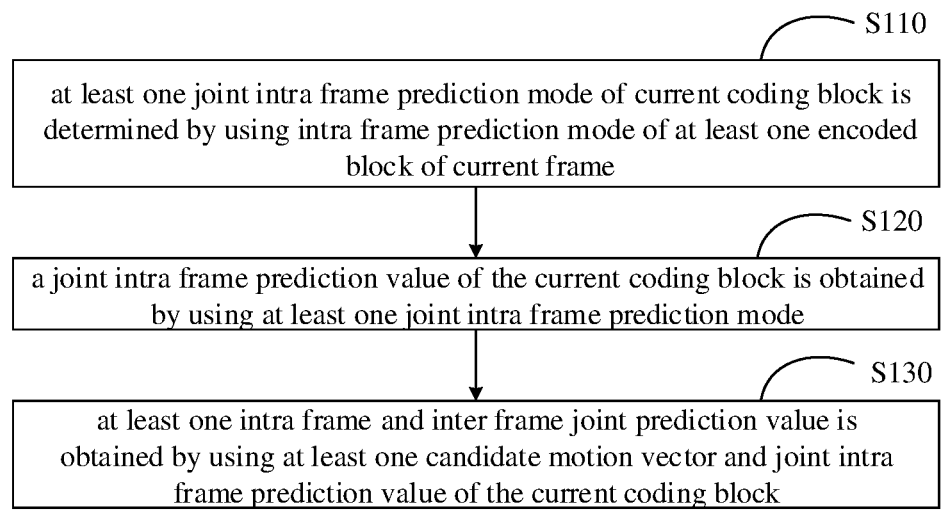
FIG. 1 is a flow chart of an intra frame and inter frame joint prediction method according to one embodiment of the present disclosure.

In order to facilitate the understanding of the present disclosure, the present disclosure will be described more fully hereinafter with reference to the accompanying drawings. Preferred embodiments of the present disclosure are given in the drawings. However, the present disclosure may be embodied in many different forms and is not limited to the embodiments described herein. Rather, these embodiments are provided so that the present disclosure will be more fully understood.

In some embodiments, the present disclosure provides an intra frame and inter frame joint prediction method. The method includes determining at least one joint intra frame prediction mode of current coding block based on intra frame prediction mode of at least one encoded block of current frame, or determining the at least one joint intra frame prediction mode of the current coding block based on content characteristics of the current coding block, or taking at least one first specified intra frame prediction mode as the at least one joint intra frame prediction mode of current coding block; obtaining a joint intra frame prediction value of the current coding block based on the at least one joint intra frame prediction mode; and obtaining at least one intra frame and inter frame joint prediction value based on at least one candidate motion vector (MV) and the joint intra frame prediction value of the current coding block.

Alternatively, the determining at least one joint intra frame prediction mode includes: in response to existence of available encoded blocks in the current frame, selecting at least one available encoded block as reference encoded block with size information of the current coding block, and taking the intra frame prediction mode of the reference encoded block as the joint intra frame prediction mode; and in response to non-existence of the available encoded blocks in the current frame, taking second specified intra frame prediction mode as the joint intra frame prediction mode.

Alternatively, the reference encoded blocks are included in the at least one available encoded block on the long side of the current coding block in response to width and height of the current coding block being not equal and the existence of the available encoded blocks on long side of the current coding block. The non-existence of the available encoded blocks on the long side of the current coding block and the existence of the available encoded blocks on short side of the current coding block, and the reference encoded blocks are included in the at least one available encoded block on the short side of the current coding block in response to width and height of the current coding block being not equal. The reference encoded blocks are included in the at least one available encoded block on the long side or short side of the current coding block in response to width and height of the current coding block being equal, and the existence of the available encoded blocks on the long side or short side of the current coding block.

Alternatively, the reference encoded blocks are included in the at least one available encoded block on the long side and the short side of the current coding block in response to width and height of the current coding block being not equal and the existence of the available encoded blocks on both the long side and the short side of the current coding block.

Alternatively, the joint intra frame prediction value of the current coding block is a weighted average value of reference intra frame prediction values, and each reference intra frame prediction value is obtained based on each joint intra frame prediction mode to make intra frame prediction for the current coding block.

Alternatively, the width and height of the current coding block are not equal, the reference encoded blocks are included in the available encoded blocks on the long side and the short side of the current coding block, the joint intra frame prediction modes include long side intra frame prediction mode and short side intra frame prediction mode, the long side intra frame prediction mode is an intra frame prediction mode of the available encoded blocks on the long side of the current coding block among the reference encoded blocks, the short side intra frame prediction mode is an intra frame prediction mode of the available encoded blocks on the short side of the current coding block among the reference encoded blocks. The obtaining joint intra frame prediction value of the current coding block includes: using each joint intra prediction mode to make intra prediction for the current coding block to obtain the reference intra prediction values, wherein the reference intra frame prediction values comprise long side intra frame prediction values and short side intra frame prediction values, the long side intra frame prediction values are obtained based on the long side intra frame prediction mode to make intra frame prediction for the current coding block, and the short side intra frame prediction values are obtained based on the short side intra frame prediction mode to make intra frame prediction for the current coding block; calculating long side statistical intra frame prediction value and short side statistical intra frame prediction value based on the reference intra frame prediction values, wherein the long side statistical intra frame prediction value is the weighted average value of all the long side intra frame prediction value and the short side statistical intra frame prediction value is the weighted average value of all the short side intra frame prediction values; and calculating weighted average value of the long side statistical intra prediction value and the short side statistical intra prediction value as the joint intra prediction value, wherein the weight of long side statistical intra frame prediction value is greater than that of short side statistical intra frame prediction value.

Alternatively, the intra frame and inter frame joint prediction value is weighted average value of candidate inter frame prediction value and the joint intra frame prediction value, the candidate inter frame prediction value is obtained by making inter frame prediction of the current coding block using the candidate MV, the relationship between the weight of the candidate inter frame prediction value and the weight of the joint intra frame prediction value is determined according to the source of the joint intra frame prediction mode.

Alternatively, the weight of the candidate inter frame prediction value is less than the weight of the joint intra frame prediction value in response to at least part of the joint intra frame prediction mode being the intra frame prediction mode of the available encoded blocks on the long side of the current coding block. The weight of the candidate inter frame prediction value is equal to the weight of the joint intra frame prediction value in response to the joint intra frame prediction mode being the intra frame prediction mode of the available encoded blocks on the short side of the current coding block. The weight of the candidate inter frame prediction value is greater than the weight of the joint intra frame prediction value in response to the joint intra frame prediction mode being the second specified intra frame prediction mode.

Alternatively, the determining at least one joint intra frame prediction mode of current coding block includes: counting occurrence times of the intra frame prediction mode of at least one available encoded blocks in the current frame to obtain statistical results, and determining the joint intra frame prediction mode by the statistical results in response to the existence of the available encoded blocks in the current frame; and taking the second specified intra frame prediction mode as the joint prediction mode in response to the non-existence of the available encoded blocks in the current frame.

Alternatively, the determining the joint intra frame prediction mode includes: selecting specified number of intra frame prediction mode with largest number of occurrences in the statistical results as the joint intra frame prediction mode.

Alternatively, the joint intra frame prediction value of the current coding block is the weighted average value of the reference intra frame prediction values, each reference intra frame prediction value is obtained based on each joint intra frame prediction mode to make intra frame prediction for the current coding block, and the weight of the reference intra frame prediction values is positively correlated with at least one of the occurrence times of the corresponding joint intra frame prediction mode and similarity of the content features of the current coding block.

Alternatively, the intra frame and inter frame joint prediction value is the weighted average value of candidate inter frame prediction value and the joint intra frame prediction value, the candidate inter frame prediction value is obtained by making the inter frame prediction for the current coding block using the candidate MV, and relationship between the weight of the candidate inter frame prediction value and the weight of the joint intra frame prediction value is determined according to the statistical results.

Alternatively, the weight of the candidate inter frame prediction value is less than the weight of the joint intra frame prediction value in response to first occurrence greater than or equal to first threshold, and the first occurrence number is the maximum number of occurrences in the statistical results. The weight of the candidate inter frame prediction value is equal to the weight of the joint intra frame prediction value in response to the first occurrence less than the first threshold and greater than or equal to second threshold. The weight of the candidate inter frame prediction value is greater than that of the joint intra frame prediction value in response to the first occurrence less than the second threshold or the joint intra frame prediction mode being the second specified intra frame prediction mode.

Alternatively, the second specified intra frame prediction mode is Planar mode. The at least one candidate MV is part or all of the MVs in candidate MV list constructed by the current coding block, or some or all of the MVs in the candidate MV list after rough selection.

Alternatively, the determining at least one joint intra frame prediction mode includes: obtaining the texture direction features of the current coding block, and taking at least one intra frame prediction mode corresponding to the texture direction as the joint intra frame prediction mode. Or the determining at least one joint intra frame prediction mode includes: obtaining multiple intra frame prediction values and corresponding prediction costs of the current coding block, and taking the intra frame prediction mode corresponding to the intra frame prediction value with lowest prediction cost as the joint intra frame prediction mode.

Alternatively, preferred intra frame prediction mode and at least one adjacent intra frame prediction mode are taken as the joint intra frame prediction mode, the preferred intra frame prediction mode is the intra frame prediction mode corresponding to the intra frame prediction value with the lowest prediction cost, and the adjacent intra frame prediction mode is the intra frame prediction mode on both sides of adjacent side of the preferred intra frame prediction mode, wherein in response to the preferred intra frame prediction mode being Planar mode, the adjacent intra frame prediction mode is DC mode.

Alternatively, the taking at least one first specified intra frame prediction mode includes: the first specified intra frame prediction mode being the intra frame prediction mode other than Planar mode.

Alternatively, multiple first specified intra frame prediction modes are taken as at least one joint intra frame prediction mode of the current coding block, the joint intra frame prediction value of the current coding block is the weighted average value of reference intra frame prediction values, and each reference intra frame prediction value is obtained by making intra frame prediction for the current coding block using each joint intra frame prediction mode.

In some embodiments, the present disclosure provides a codec device. The codec device includes a processor and a non-transitory program storage medium coupled to the processor. The non-transitory program storage medium is configured to store a program, and the processor is configured to execute the program to perform: determining at least one joint intra frame prediction mode of current coding block based on intra frame prediction mode of at least one encoded block of current frame, or determining the at least one joint intra frame prediction mode of the current coding block based on content characteristics of the current coding block, or taking at least one first specified intra frame prediction mode as the at least one joint intra frame prediction mode of current coding block; obtaining a joint intra frame prediction value of the current coding block based on the at least one joint intra frame prediction mode; and obtaining at least one intra frame and inter frame joint prediction value based on at least one candidate MV and the joint intra frame prediction value of the current coding block.

In some embodiments, the present disclosure provides a non-transitory storage medium storing instructions, when executed, causing a processor to perform: determining at least one joint intra frame prediction mode of current coding block based on intra frame prediction mode of at least one encoded block of current frame, or determining the at least one joint intra frame prediction mode of the current coding block based on content characteristics of the current coding block, or taking at least one first specified intra frame prediction mode as the at least one joint intra frame prediction mode of current coding block; obtaining a joint intra frame prediction value of the current coding block based on the at least one joint intra frame prediction mode; and obtaining at least one intra frame and inter frame joint prediction value based on at least one candidate MV and the joint intra frame prediction value of the current coding block.

Referring to FIG. 1, FIG. 1 is a flow chart of an intra frame and inter frame joint prediction method according to one embodiment of the present disclosure. In the embodiment, the method can include operations at blocks illustrated in FIG. 1.

At block S110, at least one joint intra frame prediction mode of current coding block is determined based on intra frame prediction mode of at least one encoded block of current frame; or at least one joint intra frame prediction mode of the current coding block is determined based on the content characteristics of the current coding block; or at least one first specified intra frame prediction mode is taken as at least one joint intra frame prediction mode of the current coding block.

In the embodiment, the encoded block has strong spatial correlation with the current coding block or has strong texture similarity with the current coding block. This is because the intra frame prediction mode of the current coding block may be similar to that of the encoded block.

Figure 2:
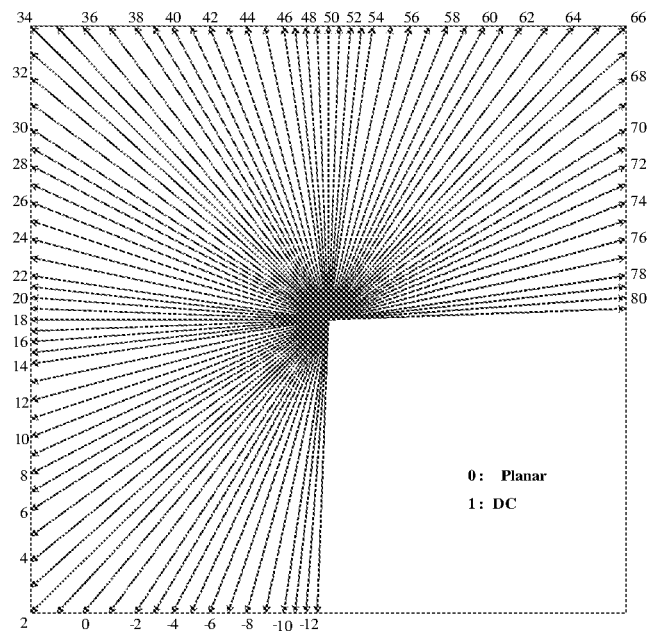
FIG. 2 is a schematic diagram of an intra frame prediction mode according to one embodiment of the present disclosure.

Referring to FIG. 2, FIG. 2 is a schematic diagram of an intra frame prediction mode according to the embodiment of the present disclosure. The intra frame prediction modes can be divided into Planar, DC and multiple angle modes. Angle modes can be divided into general angle mode and wide angle mode. 2~N represents general angle model. Planar and DC are general non angle modes. When N is 66, 2~66 is the general angle model, and the angle model −13~1 and 67~81 refer to the wide angle models Different angle models represent different prediction directions. A prediction model 18 represents horizontal direction and the prediction model 50 represents vertical direction. The prediction modes make use of correlation between coding blocks and coding blocks in the same frame to get the final prediction value based on different prediction methods.

At block S120, a joint intra frame prediction value of the current coding block is obtained based on at least one joint intra frame prediction mode.

In the embodiment, the joint intra frame prediction value is obtained by weighting the prediction values obtained from intra frame prediction of current coding block in each joint intra frame prediction mode.

At block S130, at least one intra frame and inter frame joint prediction value is obtained based on at least one candidate motion vector and joint intra frame prediction value of the current coding block.

In the embodiment, the intra frame and inter frame joint prediction value is obtained by weighting the inter frame prediction value and the joint intra frame prediction value. The inter frame prediction value is obtained by making inter frame prediction with candidate motion vectors.

In the embodiment, the joint intra frame prediction mode of the current coding block is determined based on the intra frame prediction mode of the encoded block, and the correlation between the intra frame prediction mode of the current coding block and the intra frame prediction mode of the encoded block is fully considered. Thus, the accuracy of the prediction value can be improved, the time redundancy can be further removed, and the compression rate of the inter coding can be improved.

Figure 3:
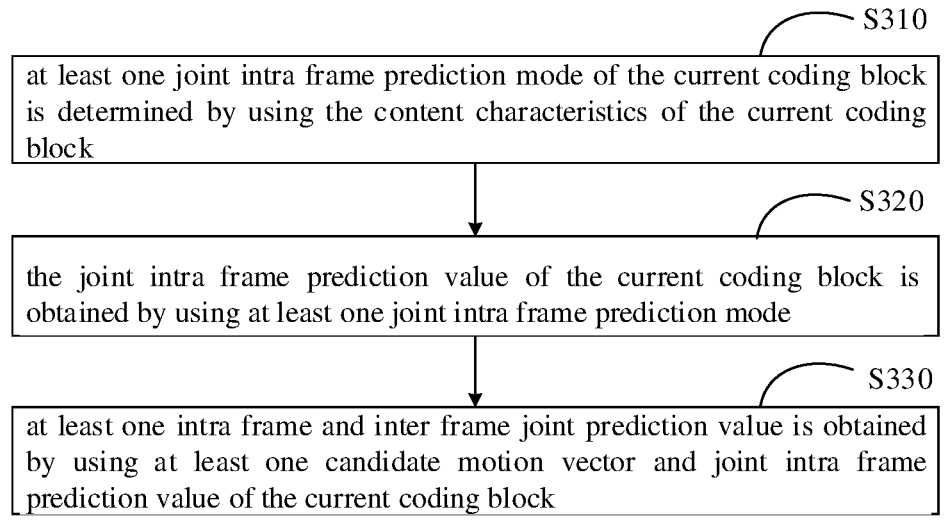
FIG. 3 is a flow chart of an intra frame and inter frame joint prediction method according to another embodiment of the present disclosure.

Referring to FIG. 3, FIG. 3 is a flow chart of the intra frame and inter frame joint prediction method according to another embodiment of the present disclosure. In the embodiment, the method can include operations at blocks illustrated in FIG. 3.

At block S310, at least one joint intra frame prediction mode of the current coding block is determined based on the content characteristics of the current coding block.

In the embodiment, texture direction features can be used to characterize content characteristic information of the current coding block. Features are not limited, and other features can also be used to characterize the content characteristic information of the current coding block.

At block S320, the joint intra frame prediction value of the current coding block is obtained based on at least one joint intra frame prediction mode.

In the embodiment, the joint intra frame prediction value is obtained by weighting the prediction values obtained from intra frame prediction of current coding block in each joint intra frame prediction mode.

At block S330, at least one intra frame and inter frame joint prediction value is obtained based on at least one candidate motion vector and joint intra frame prediction value of the current coding block.

In the embodiment, the intra frame and inter frame joint prediction value is obtained by the weighting the inter frame prediction value and the joint intra frame prediction value. The inter frame prediction value is obtained by making inter frame prediction with candidate motion vectors.

Through the above-mentioned embodiment, the content characteristics of the current coding block are fully considered, so that the selected intra frame prediction mode is closer to the current coding block. Thus the prediction accuracy can be improved, temporal redundancy can be removed, and the compression ratio of inter frame coding can be improved.

Figure 4:
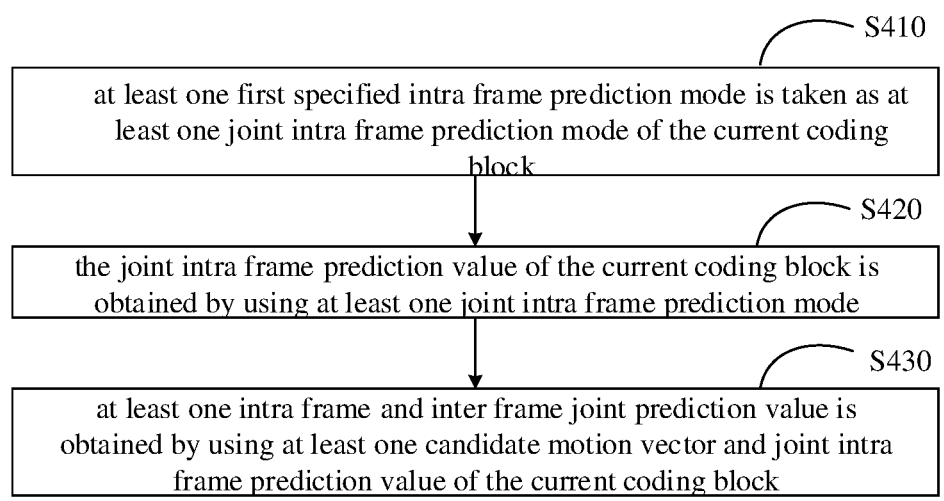
FIG. 4 is a flow chart of an intra frame and inter frame joint prediction method according to another embodiment of the present disclosure.

Referring to FIG. 4, FIG. 4 is a flow chart of the intra frame and inter frame joint prediction method according to another embodiment of the present disclosure. In the embodiment, the method can include operations at blocks illustrated in FIG. 4.

At block S410, at least one first specified intra frame prediction mode is taken as at least one joint intra frame prediction mode of the current coding block.

In the embodiment, the first specified intra frame prediction mode is the intra frame prediction mode other than the Planar mode, such as the angle mode shown in FIG. 2.

At block S420, the joint intra frame prediction value of the current coding block is obtained based on at least one joint intra frame prediction mode.

In the embodiment, the joint intra frame prediction value is obtained by weighting the prediction values obtained from intra frame prediction of current coding block in each joint intra frame prediction mode.

At block S430, at least one intra frame and inter frame joint prediction value is obtained based on at least one candidate motion vector and joint intra frame prediction value of the current coding block.

In one embodiment, the intra frame and inter frame joint prediction value is obtained by the weighting the inter frame prediction value and the joint intra frame prediction value. The inter frame prediction value is obtained by making inter frame prediction with candidate motion vectors.

Through the above-mentioned embodiment, the selection range of the specified intra frame prediction mode is expanded, the probability of selecting a better intra frame prediction mode is increased, and the prediction accuracy is also improved.

In the method provided by the present disclosure, the joint intra frame prediction mode can be determined according to the size information (eg. width height relationship) of the current coding block. The joint intra frame prediction mode can also be determined with the statistical results after counting the intra frame prediction modes of the encoded blocks on both sides of the current coding block. The joint intra frame prediction mode can also be determined based on content characteristics of the current coding block. Or the joint intra frame prediction mode can also be determined by specifying the intra frame prediction Mode.

In one embodiment, when there are available encoded blocks in the current frame, at least one available encoded block is selected as the reference encoded block with the size information of the current coding block, and the intra frame prediction mode of the reference encoded block is taken as the joint intra frame prediction mode. When there is no available encoded block in the current frame, the second specified intra frame prediction mode is taken as the joint prediction mode. The available encoded block refers that the encoded block is an intra encoded block. The second specified intra frame prediction mode can be Planar mode.

Specifically, that at least one available encoded block is selected as the reference encoded block with the size information of the current coding block may comprise the following situations.

When the width and height of the current coding block are not equal and there are available encoded blocks on the long side of the current coding block, the reference encoded blocks are included in at least one available encoded block on the long side of the current coding block. At least one different intra frame prediction mode can be selected from the intra frame prediction modes of the encoded intra blocks on the long side of the current coding block, and the selected intra frame prediction mode is taken as the joint intra frame prediction mode.

When the width and height of the current coding block are not equal, there are no available encoded blocks on the long side of the current coding block and there are an available encoded blocks on the short side of the current coding block, then the reference encoded blocks are included in at least one available encoded block on the short side of the current coding block. At least one different intra frame prediction mode can be selected from the intra frame prediction modes of the encoded intra blocks on the short side of the current coding block, and the selected intra frame prediction mode can be taken as the joint intra frame prediction mode.

When the width and height of the current coding block are equal, and there are available encoded blocks on the long side and/or short side of the current coding block, the reference encoded blocks are included in at least one available encoded block on the long side and/or short side of the current coding block. At least one different intra frame prediction mode can be selected from the intra frame prediction modes of the encoded intra blocks on both sides of the current coding block, and the selected intra frame prediction mode is taken as the joint intra frame prediction mode. The two sides of the current coding block are equal, and two sides can refer to the upper side and the left side of the current coding block.

In the embodiment, the available encoded blocks on the long side of the current coding block are preferentially selected as the reference encoded blocks. When there are no available encoded blocks on the long side of the current coding block, the available encoded blocks on the short side of the current coding block are selected as the reference encoded blocks, because the correlation between the current coding block and the encoded blocks on the long side is higher than that on the short side. When there are no available encoded blocks on either sides of the current coding block, Planar mode is selected as the intra frame prediction mode of the intra frame and inter frame joint prediction.

In one embodiment, when there are multiple available encoded blocks, multiple available encoded blocks can be selected as reference encoded blocks, and multiple different joint intra frame prediction modes can be selected. When the width and height of the current coding block are not equal, and there are available encoded blocks on both the long side and the short side of the current coding block, the reference encoded blocks are included in at least one available encoded blocks on the long side and the short side of the current coding block.

In another embodiment, when there are available encoded blocks in the current frame, the occurrence times of the intra frame prediction mode of at least one available encoded block in the current frame are counted to obtain the statistical results, and the joint intra frame prediction mode is determined by the statistical results. When there is no available encoded blocks in the current frame, the second specified intra frame prediction mode is taken as the joint prediction mode.

In the embodiment, that the joint intra frame prediction mode is determined by the statistical results may include: selecting the specified number of intra frame prediction modes with the largest number of occurrences in the statistical results as the joint intra frame prediction mode.

Specifically, encoded blocks in N positions are selected on both sides of the current coding block, wherein N>0. The both sides here refer to the upper and left sides of the current coding block. The number of the same intra frame prediction modes in these encoded blocks is counted and sorted from large to small. The first M intra frame prediction modes are selected as the joint intra frame prediction mode. When M is equal to 0, the Planar mode is selected as the joint intra frame prediction mode. The accuracy of intra frame prediction mode can be improved by selecting the intra frame prediction mode with more occurrences.

In one embodiment, at least one joint intra frame prediction mode of the current coding block may be determined using the content characteristics of the current coding block. In the embodiment, the content characteristic information of the current coding block can be characterized by the texture direction feature. Features characterizing the content characteristic information of the current coding block are not limited, and other features can also be used to characterize the content characteristic information of the current coding block. The texture direction feature of the current coding block can be calculated by the texture gradient, and the texture direction $\theta$ of the current coding block can be obtained by formula (1):

$$grad_x = \sum_{j=1}^{h} \sum_{i=1}^{w} (|p_{i,j} - p_{i-1,j}|) \quad (1)$$

$$grad_y = \sum_{j=1}^{h}\sum_{i=1}^{w}(|p_{i,j} - p_{i-1,j}|)$$

$$\theta = \arctan\left(\frac{grad_y}{grad_x}\right)$$

In the formula (1), i represents the abscissa and j represents ordinate of the pixels in the current coding block. The angular coordinates of the pixels in the current coding block start from (1, 1), and p represents the pixel value of the pixels in the image block.

After obtaining the texture direction of the current coding block, at least one intra frame prediction mode corresponding to the texture direction is taken as the joint intra frame prediction mode. For example, one or more intra frame prediction modes closest to the texture direction can be selected as the joint intra frame prediction mode.

In one embodiment, multiple intra frame prediction modes can be selected to make intra frame prediction for the current coding block to obtain multiple intra frame prediction values. Prediction cost of multiple intra frame prediction values can be calculated. The intra frame prediction mode corresponding to the intra frame prediction value with the lowest prediction cost can be selected as the joint intra frame prediction mode. The preferred intra frame prediction mode and at least one adjacent intra frame prediction mode can also be taken as the joint intra frame prediction mode. The preferred intra frame prediction mode is the intra frame prediction mode corresponding to the intra frame prediction value with the lowest prediction cost. The adjacent intra frame prediction mode is the intra frame prediction mode on both sides of the adjacent side of the preferred intra frame prediction mode. When the preferred intra frame prediction mode is horizontal mode H, the adjacent intra frame prediction modes are H−1 and H+1, and the three intra frame prediction modes of H, H−1 and H+1 can be selected as the joint intra frame prediction modes. When the preferred intra frame prediction mode is Planar mode, the adjacent intra frame prediction mode is DC mode, that is, only DC mode is taken as the adjacent intra frame prediction mode of Planar mode.

Through the above-mentioned embodiment, the content characteristics of the current coding block are fully considered, so that the selected intra frame prediction mode is closer to the current coding block. Thus the prediction accuracy can be improved, time redundancy can be removed, and the compression ratio of inter frame coding can be improved.

In one embodiment, at least one first specified intra frame prediction mode may be taken as at least one joint intra frame prediction mode of the current coding block. The first specified intra frame prediction mode is an intra frame prediction mode other than the Planar mode, for example, the first specified intra frame prediction mode may be the angle mode shown in FIG. 2. The first specified intra prediction mode may be multiple. Through the embodiment, the selection range of the specified intra frame prediction mode is expanded, the probability of selecting the better intra frame prediction mode is increased, and the prediction accuracy is also improved.

After the joint intra frame prediction mode is determined, the joint intra frame prediction mode can be used to make intra frame prediction of the current coding block to obtain the joint intra frame prediction value. Any of the above methods can be used to obtain the joint intra frame prediction mode.

In one embodiment, the joint intra frame prediction value of the current coding block is the weighted average value of the reference intra frame prediction values, and each reference intra frame prediction value is obtained based on each joint intra frame prediction mode to make intra frame prediction for the current coding block. That is, Firstly, the intra frame prediction of the current coding block is carried out in each joint intra frame prediction mode to obtain multiple reference intra frame prediction values, and then the multiple reference intra frame prediction values are weighted to obtain the joint intra frame prediction value. The weights of prediction values of different reference frames can be set according to the different correlation between the current coding block and the encoded blocks. The stronger the correlation, the greater the weight.

In one embodiment, the joint intra frame prediction mode is selected with the size information of the current coding block. When the width and height of the current coding block are not equal, the reference encoded blocks are included in the available encoded blocks on the long side and the short side of the current coding block. The joint intra frame prediction mode comprises the long side intra frame prediction mode and the short side intra frame prediction mode. The long side intra frame prediction mode refers to the intra frame prediction mode of the available encoded blocks on the long side of the current coding block among the reference encoded blocks. The short side intra frame prediction mode refers to the intra frame prediction mode of the available encoded block on the short side of the current coding block among the reference encoded blocks. That the joint intra frame prediction value of the current coding block is obtained based on at least one joint intra frame prediction mode may include the following operations.

Each joint intra prediction mode is used to make intra prediction for the current coding block to obtain the reference intra prediction values. The reference intra frame prediction values comprise long side intra frame prediction values and short side intra frame prediction values. The long side intra frame prediction value is obtained based on the long side intra frame prediction mode to make intra frame prediction for the current coding block. The short side intra frame prediction value is obtained based on the short side intra frame prediction mode to make intra frame prediction for the current coding block. The long side statistical intra frame prediction value and short side statistical intra frame prediction value are calculated based on the reference intra frame prediction values. The long side statistical intra frame prediction value is the weighted average value of all the long side intra frame prediction values, and the short side statistical intra frame prediction value is the weighted average value of all the short side intra frame prediction values. The weighted average value of the long side statistical intra prediction value and the short side statistical intra prediction value is calculated as the joint intra prediction value. The weight of long side statistical intra frame prediction value is greater than that of short side statistical intra frame prediction value.

Specifically, when the selected joint intra frame prediction mode comprises at least one different intra frame prediction mode among the intra frame prediction modes of the encoded intra block on the long side of the current coding block, the mathematical relationship between the final prediction value $P_l$ of the long side of the current coding block and the predicted values p1 . . . pn under each long side intra frame prediction mode is as follows:

$$P_l = a1 * p1 + a2 * p2 + \ldots + an * pn \quad (2)$$
$$a1 + a2 + \ldots + an = 1$$

In the mathematical relationship (2), n is the number of selected long side intra frame prediction modes, and n>0. In addiction, a1 . . . an are the weights of each long side intra prediction values and all the weights are in the range of [0, 1].

When the selected joint intra frame prediction mode comprises at least one different intra frame prediction mode among the prediction modes of the encoded intra block on the short side of the current coding block, the mathematical relationship between the final prediction value $P_s$ on the short side of the current coding block and the predicted values q1 . . . qn under each short side intra frame prediction mode is as follows:

$$P_s = b1 * q1 + b2 * q2 + \ldots + bn * qn \quad (3)$$
$$b1 + b2 + \ldots + bn = 1$$

In the mathematical relationship (3), n is the number of selected short side intra frame prediction modes, and n>0. In addiction, b1 . . . bn are the weights of each short side intra frame prediction values, and all weights are in the range of [0, 1].

When the intra frame prediction mode of the selected joint prediction comprises the intra frame prediction mode of the coded intra block on both sides of the long side and the short side of the current coding block, the mathematical relationship between the final joint intra frame prediction value $P_{int\ ra}$ of the current coding block and the statistical intra frame prediction values $P_l$ and $P_s$ on both sides of the current coding block is as follows:

$$P_{intra} = c1 * p_l + c2 * p_s \quad (4)$$
$$c1 + c2 = 1$$

In the mathematical relationship (4), c1 is the weight of the statistical intra frame prediction value of the long side of the current coding block and c2 is the weight of the statistical intra frame prediction values of the short side of the current coding block. Both the weights are in range of [0, 1], and c1>c2.

When the encoded blocks on both sides of the current coding block are not available, Planar mode is selected as the joint intra frame prediction mode, and the final joint intra frame prediction value $P_{int\ ra}$ of the current coding block is the intra frame prediction value of the current coding block in Planar mode.

When the width and height of the current coding block are equal, under this size, there is no difference between the long and short sides of the current code block. The long side statistical intra frame prediction value $P_l$ is recorded as the reference intra frame prediction values on one side of the current coding block, for example, the reference intra frame prediction values on the upper side of the current coding block. The short side statistical intra frame prediction value $P_s$ is recorded as the reference intra frame prediction values on the other side of the current coding block, for example, the reference intra frame prediction values on the left side of the current coding block. The joint intra frame prediction value of the current coding block can be obtained based on the above mathematical relationship 1-3, and the size relationship of c1 and c2 is not limited under the size.

In one embodiment, the joint intra frame prediction mode is determined based on the statistical result. The statistical result is obtained by counting the occurrence times of the intra frame prediction mode of at least one available encoded block in the current frame. In the embodiment, the joint intra frame prediction value of the current coding block is the weighted average value of the reference intra frame prediction values, and each reference intra frame prediction value is obtained by making intra frame prediction for the current coding block with each joint intra frame prediction mode. The weight of the reference intra frame prediction values is positively correlated with the occurrence times of the corresponding joint intra frame prediction mode. In other words, the setting of weight is related to the statistical number of intra frame prediction modes of available encoded block on both sides of the current coding block. The more the number of intra frame prediction modes is, after the intra frame prediction using the intra frame prediction modes, the greater the weight of prediction values in the intra frame prediction modes is, otherwise the smaller the weight of prediction values in the intra frame prediction modes is.

Specifically, when the selected joint intra frame prediction modes comprise at least one different intra frame prediction mode among the available encoded blocks intra frame prediction modes on both sides of the current coding block, the mathematical relationship between the final joint intra frame prediction value $P_{int\ ra}$ of the current coding block and the prediction values s1 . . . sn from more to less corresponding to the number of intra frame prediction modes is as follows:

$$P_{intra} = d1 * s1 + d2 * s2 + \ldots + dn * sn \quad (5)$$
$$d1 + d2 + \ldots + dn = 1$$

In the mathematical relationship (5), n refers to the number of selected joint intra frame prediction modes, and n>0. In addition, d1 . . . dn are the weights of reference intra frame prediction values, and all the weights are in the range of [0, 1], and satisfy the relationship:

$$d1 > d2 > \ldots > dn.$$

When the encoded blocks on both sides of the current coding block are not available, Planar mode is selected as the joint intra frame prediction mode, and the final joint intra frame prediction value $P_{int\ ra}$ of the current coding block is the intra frame prediction value of the current coding block in Planar mode.

In one embodiment, the joint intra frame prediction mode is determined based on the content characteristics of the current coding block. In the embodiment, the joint intra frame prediction value of the current coding block is the weighted average value of the reference intra frame prediction values, and each reference intra frame prediction value is obtained by intra frame prediction of the current coding block using each joint intra frame prediction mode. The weight of the reference intra frame prediction values is positively correlated with the similarity between the corresponding joint intra frame prediction mode and the content characteristics of the current coding block.

Specifically, the mathematical relationship between the joint intra frame prediction value $P_{int\ ra}$ of the current coding block and the obtained prediction values y1 ... yn corresponding to the intra frame prediction modes close to the content characteristics of the current coding block is as follows:

$$P_{intra} = f1*y1 + f2*y2 + \ldots + fn*yn \qquad (6)$$
$$f1 + f2 + \ldots + fn = 1$$

In the mathematical relationship (6), n is the number of selected joint intra frame prediction modes, and n>0. In addition, f1 ... fn are the prediction value weights, and all the weights are in range of [0, 1]. Generally, the closer to the content characteristics of the current coding block the intra frame prediction mode is, the greater the prediction value weight.

In one embodiment, at least one first specified intra frame prediction mode is taken as at least one joint intra frame prediction mode of the current coding block. The mathematical relationship between the final intra frame prediction value $P_{int\ ra}$ of the current coding block and the prediction values x1 ... xn corresponding to the first specified intra frame prediction modes is as follows:

$$P_{intra} = e1*x1 + e2*x2 + \ldots + dn*xn \qquad (7)$$
$$e1 + e2 + \ldots + en = 1$$

In the mathematical relationship (7), n is the number of selected joint intra frame prediction modes, and n>0. In addition, e1 ... en are the weights of the prediction values, and all the weights are in range of [0, 1]. The weights can be set as required.

After obtaining the joint intra frame prediction value of the current coding block, at least one intra frame and inter frame joint prediction value can be obtained based on at least one candidate motion vector and the joint intra frame prediction value of the current coding block. The joint intra frame prediction value can be obtained by any of the above methods.

In the embodiment, the intra frame and inter frame joint prediction value is the weighted average value of candidate inter frame prediction value and the joint intra frame prediction value. The candidate inter frame prediction value is obtained from the inter frame prediction of the current coding block based on the candidate motion vector. The relationship between the weight of the candidate inter frame prediction value and the weight of the joint intra frame prediction value is determined according to the source of the joint intra frame prediction mode. The candidate motion vectors are selected from a motion vector candidate list. Please refer to the details of the description below.

Specifically, the joint intra frame prediction value $P_{int\ ra}$ of the current coding block and the inter frame prediction value $P_{int\ er}$ obtained by inter frame prediction under the specified MV are weighted to obtain the final intra frame joint prediction value P. the mathematical relationship is as follows:

$$P = \alpha * P_{intra} + \beta * P_{inter} \qquad (8)$$
$$\alpha + \beta = 1$$

In the mathematical relationship (8), $\alpha$ is the weight of joint intra frame prediction value and $\beta$ is the weight of inter frame prediction value, and both the weights are in range of [0, 1]. The relationship of the values between $\alpha$ and $\beta$ is different under different conditions. The following is a detailed description of different joint intra prediction mode acquisition methods.

In one embodiment, the joint intra frame prediction mode is selected based on the size information of the current coding block.

In the embodiment, when at least part of the joint intra frame prediction mode is the intra frame prediction mode of the available encoded block on the long side of the current coding block, the weight of the candidate inter frame prediction value is less than the weight of the joint intra frame prediction value.

In the embodiment, when the joint intra frame prediction mode is the intra frame prediction mode of the available encoded blocks on the short side of the current coding block, the weight of the candidate inter frame prediction value is equal to the weight of the joint intra frame prediction value.

In the embodiment, when the joint intra frame prediction mode is the second specified intra frame prediction mode, the weight of the candidate inter frame prediction value is greater than the weight of the joint intra frame prediction value.

Specifically, when the width and height of the current encoding block are not equal, it is divided into the following situations.

When the selected joint intra frame prediction mode includes the intra frame prediction mode of the long side of the current coding block, then $\alpha>\beta$.

When the encoded blocks on both sides of the current coding block are not available, the Planar mode is selected as the joint intra frame prediction mode. Then $\alpha<\beta$.

When the selected joint intra frame prediction mode only includes the intra frame prediction mode on the short side of the current coding block, then $\alpha=\beta$.

When the width and height of the current code block are equal, it is divided into the following situations.

When the selected joint intra frame prediction mode comprises at least one intra frame prediction mode on both sides of the current coding block, then $\alpha>=\beta$.

When the encoded blocks on both sides of the current coding block are not available, the planar mode is selected as the joint intra frame prediction mode. Then $\alpha<\beta$.

In one embodiment, the joint intra frame prediction mode is determined based on the statistical result. The statistical result is obtained by counting the occurrence times of the intra frame prediction mode of at least one available encoded block in the current frame.

In the embodiment, when first occurrence times is greater than or equal to first threshold, the weight of the candidate inter frame prediction value is less than that of the joint intra frame prediction value, and the first occurrence number is the maximum number of occurrences in the statistical results.

In the embodiment, when the first occurrence is less than the first threshold and greater than or equal to second threshold, the weight of the candidate inter frame prediction value is equal to the weight of the joint intra frame prediction value.

In the embodiment, when the first occurrence is less than the second threshold or the joint intra frame prediction mode is the second specified intra frame prediction mode, the weight of the candidate inter frame prediction value is greater than that of the joint intra frame prediction value.

Specifically, when the number of intra frame prediction modes with the largest number among the selected joint intra frame prediction modes is greater than or equal to threshold value T1, wherein T1>0, then $\alpha>\beta$.

When the number of intra frame prediction modes with the largest number among the selected joint intra frame prediction modes is less than the threshold value T1 and greater than or equal to the prediction value T2, wherein T1>T2, T2>0, then $\alpha=\beta$.

When the number of intra frame prediction modes with the largest number among the selected joint intra frame prediction modes is less than T2 or the encoded blocks on both sides of the current coding block are not available, wherein T2>0, then $\alpha<\beta$.

In one embodiment, the joint intra frame prediction mode is determined with the content characteristics of the current coding block. In the embodiment, the relationship of the values between $\alpha$ and $\beta$ is not limited, and the values between $\alpha$ and $\beta$ can be selected according to needs.

In one embodiment, at least one first specified intra frame prediction mode is taken as at least one joint intra frame prediction mode of the current coding block. In the embodiment, the relationship of the values between $\alpha$ and $\beta$ is not limited, and the values between $\alpha$ and $\beta$ can be selected according to needs.

The following description is for the purpose of illustrating the present disclosure through several groups of specific embodiments, but not for limitation.

Figure 5:
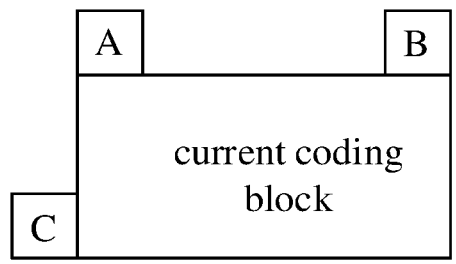
FIG. 5 is a schematic diagram of a position relationship between a current coding block and a encoded block according to one embodiment of the present disclosure.

Embodiment 1 of the present disclosure is provided. Referring to FIG. 5, FIG. 5 is a schematic diagram of a position relationship between the current coding block and the encoded blocks according to the embodiment of the present disclosure. In the embodiment, the size of the current coding block is 8×4, the encoded blocks at two points A and B are the encoded blocks on the long side of the current coding block, and the encoded blocks at point C are the encoded blocks on the short side of the current coding block.

In the embodiment, the encoded blocks corresponding to points A, B and C are available. In addition, the predicted values on both sides are required to be used. Moreover, the intra frame prediction modes are 2, 5, 9, and the predicted values after intra frame prediction are p1, p2, q1. The weights satisfies the relationship: a1=a2=0.5, b1=1, c1=0.6, and c2=0.4. The joint intra frame prediction value $P_{int\ ra}$ of the current coding block is calculated as follows:

$$P_{intra} = c1*(a1*p1+a2*p2)+c2*(b1*q1) = \\ 0.6*(0.5*p1+0.5*p2)+0.4*q1 \quad (9)$$

Because the selected joint intra frame prediction mode comprise the intra frame prediction mode on the long side of the current coding block, that is, the encoded blocks corresponding to points A and B are available, then the values $\alpha$ and $\beta$ are set, wherein $\alpha=0.6$ and $\beta=0.4$. The intra frame and inter frame joint prediction value of the current coding block is calculated as follows:

$$P = \alpha*P_{intra}+\beta*P_{inter} = 0.6*P_{intra}+0.4*P_{inter} \quad (10)$$

In the embodiment, the encoded blocks corresponding to points A, B and C are all not available. In addition, the selected joint intra frame prediction mode is Planar mode. The joint intra frame prediction value $P_{int\ ra}$ of the current coding block is the prediction value of the current coding block in the Planar mode. The values $\alpha$ and $\beta$ are set, wherein $\alpha=0.3$ and $\beta=0.7$. The intra frame and inter frame joint prediction value of the current coding block is calculated as follows:

$$P = \alpha^*P_{int\ ra}+\beta^*P_{int\ er} = 0.3^*P_{int\ ra}+0.7^*P_{int\ er} \quad (11)$$

Figure 6:
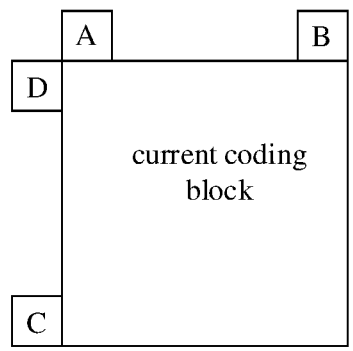
FIG. 6 is a schematic diagram of a position relationship between a current coding block and a encoded block according to another embodiment of the present disclosure.

Embodiment 2 of the present disclosure is provided. Referring to FIG. 6, FIG. 6 is a schematic diagram of the position relationship between the current coding block and the encoded blocks according to the embodiment of the present disclosure. In the embodiment, the size of the current coding block is 8×8, the encoded blocks at two points A and B are the encoded blocks on the upper side of the current coding block, and the encoded blocks at points C and D are the encoded blocks on the left side of the current coding block.

In the embodiment, the encoded blocks corresponding to A and D are not available, and the encoded blocks corresponding to B and C are available. In addition, the intra frame prediction mode corresponding to B is 18 and the predicted value after intra frame prediction is p1. The intra frame prediction mode corresponding to C is 50 and the predicted value after intra frame prediction is q1. The weights satisfies the relationship: a1=1, b1=1, c1=0.5, and c2=0.5. The joint intra frame prediction value $P_{int\ ra}$ of the current coding block is calculated as follows:

$$P_{intra} = c1*(a1*p1)+c2*(b1*q1) = 0.5*p1+0.5*q1 \quad (12)$$

Since the selected joint intra frame prediction modes comprises the intra frame prediction modes on both sides of the current coding block, that is, the encoded blocks corresponding to B and C are available, then the values $\alpha$ and $\beta$ are set, wherein $\alpha=0.5$ and $\beta=0.5$. The intra frame joint prediction value of the current coding block is calculated as follows:

$$P = \alpha^*P_{int\ ra}+\beta^*P_{int\ er} = 0.5^*P_{int\ ra}+0.5^*P_{int\ er} \quad (13)$$

Figure 7:
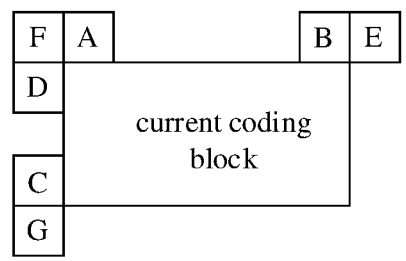
FIG. 7 is a schematic diagram of a position relationship between a current coding block and an encoded block according to another embodiment of the present disclosure.

Embodiment 3 of the present disclosure is provided. Referring to FIG. 7, FIG. 7 is a schematic diagram of the position relationship between the current coding block and the encoded blocks according to the embodiment of the present disclosure. In the embodiment, the size of the current coding block is 8×4, the encoded blocks at four points A, B, E and F are the encoded blocks on the upper side of the current coding block, and the encoded blocks at points C, D and G are the encoded blocks on the left side of the current coding block.

In the embodiment, the encoded blocks corresponding to the seven points A, B, E, F, C, D and G are available, and the intra frame prediction modes are 2, 2, 3, 1, 2, 0, 3. According to statistics, the number of modes 2 is 3, the number of modes 3 is 2, and the number of modes 0 and modes 1 is only 1. The numbers are arranged in descending order. When the numbers are the same, the modes with small number will be ranked first. The sorted list of intra frame prediction modes is {2,3,0,1} based on the above rules. The first three intra frame prediction modes in the selection list are selected to make intra frame prediction for the current coding block respectively. The predicted values after prediction are s1, s2 and s3. The weight of s1 is d1, the weight of s2 is d2, and the weight of s3 is d3. wherein d1=0.5, d2=0.3, d3=0.2. The intra frame joint prediction value $P_{int\ ra}$ of the current coding block is calculated as follows:

$$P_{intra} = d1*s1 + d2*s2 + d3*s3 = 0.5*s1 + 0.3*s2 + 0.2*s3 \qquad (14)$$

The threshold values T1 and T2 are set, wherein T1=4 and T2=2. Since the maximum number of modes 2 is 3, the values $\alpha$ and $\beta$ are set, wherein $\alpha$=0.5 and $\beta$=0.5. The intra frame and inter frame joint prediction value of the current coding block is calculated as follows:

$$P = \alpha^* P_{int\ ra} + \beta^* P_{int\ er} = 0.5^* P_{int\ ra} + 0.5^* P_{int\ er} \qquad (15)$$

Embodiment 4 of the present disclosure is provided. Planar mode, DC mode, horizontal mode, vertical mode, 2 mode, 34 mode and 66 mode are selected to carry out intra frame prediction for the current coding block respectively. By comparing the intra frame prediction rate distortion cost of each intra frame prediction mode, the minimum cost intra frame prediction mode and the three modes on the left and right sides of the minimum cost intra frame prediction mode are selected as the joint intra frame prediction mode. When the minimum cost intra frame prediction mode is Planar mode, only Planar mode and DC mode are used as joint intra frame prediction mode. When the minimum cost intra frame prediction mode is the horizontal mode H, the three intra frame prediction modes of H, H−1 and H+1 are selected as the joint intra frame prediction mode. The predicted values of the three intra frame prediction modes after intra frame prediction are y1, y2 and y3 respectively, and the weights are satisfied the relationship: f1=0.4, f1=0.4, f3=0.3. The joint intra frame prediction value $P_{int\ ra}$ of the current coding block is calculated as follows:

$$P_{intra} = f1*y1 + f2*y2 + f3*y3 = 0.4*y1 + 0.3*y2 + 0.3*y3 \qquad (16)$$

The values $\alpha$ and $\beta$ are set, wherein $\alpha$=0.5 and $\beta$=0.5. The intra frame and inter frame joint prediction value of the current coding block is calculated as follows:

$$P = \alpha^* P_{int\ ra} + \beta^* P_{int\ er} = 0.5^* P_{int\ ra} + 0.5^* P_{int\ er} \qquad (17)$$

Embodiment 5 of the present disclosure is provided. Two intra frame prediction modes, Planar mode and DC mode, are selected as the joint intra frame prediction modes of the current coding block. The intra frame prediction values after intra frame prediction are x1 and x2, and the weights satisfies the relationship: e1=e2=0.5. The joint intra frame prediction value $P_{int\ ra}$ of the current coding block is calculated as follows:

$$P_{int\ ra} = e1^*x1 + e2^*x2 = 0.5^*(x1 + x2) \qquad (18)$$

The values $\alpha$ and $\beta$ are set, wherein $\alpha$=0.5 and $\beta$=0.5. The intra frame and inter frame joint prediction value of the current coding block is calculated as follows:

$$P = \alpha^* P_{int\ ra} + \beta^* P_{int\ er} = 0.5^* P_{int\ ra} + 0.5^* P_{int\ er} \qquad (19)$$

In one embodiment, intra frame and inter frame joint prediction can be applied to the inter frame prediction stage such as conventional AMVP mode, conventional Merge mode, triangle mode, HASH mode and affine mode. An example described below of the application of intra frame joint prediction in the inter prediction stage of conventional merge mode is taken to illustrate, but not for limitation. The intra frame and inter frame joint prediction can also be applied to other modes.

In Merge mode, the intra frame and inter frame joint prediction is mainly divided into construction of MV candidate list, selection of joint intra frame prediction mode, selection of joint intra frame prediction weight (i.e. joint intra frame prediction value acquisition), selection of intra frame and inter frame joint prediction weight (i.e. intra frame and inter joint prediction value acquisition), rough selection stage and fine selection stage.

The construction of MV candidate list of Merge mode comprises the MV of the spatial adjacent block, the MV of the temporal appositive block, the HMVP (the MV of the historical encoded blocks), the average MV, and the zero MV. In the MV candidate list of Merge mode, the number of MV is set to M, and M can be 6. The following will take M being 6 as an example to explain. M can also be other values.

Figure 8:
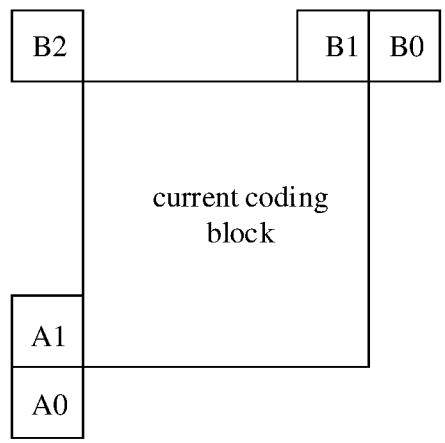
FIG. 8 is a schematic diagram of a position relationship between a current coding block and a spatial adjacent block according to one embodiment of the present disclosure.

Referring to FIG. 8, FIG. 8 is a schematic diagram of the position relationship between the current coding block and the spatial adjacent block according to the embodiment of the present disclosure. In the embodiment, one spatial candidate prediction MV is generated on the left and the top of the current coding block, and spatial domain provides at most four spatial candidate MVS, that is, the MVS of 4 adjacent blocks among 5 adjacent blocks in the FIG. 8 are used at most. The list is established in the order of A1-B1-B0-A0-(B2), wherein B2 is a complement. When at least one of A1, B1, B0, A0 does not exist and the MV of B2 is different from the MVS of A1 and B1, it is necessary to make use the MV of B2.

Figure 9:
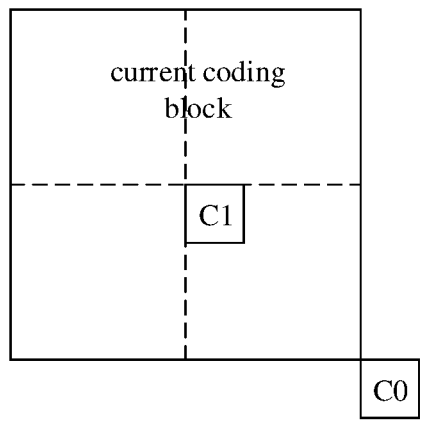
FIG. 9 is a schematic diagram of a position relationship between a current coding block and a temporal appositive block according to one embodiment of the present disclosure.

Referring to FIG. 9, FIG. 9 is a schematic diagram of a position relationship between the current coding block and the temporal block according to the embodiment of the present disclosure. When the size of the current code block is larger than 4×4, 8×4 and 4×8, the temporal MV needs to be filled into the Merge candidate list. The temporal MV is obtained based on the MV of the appositive block at the corresponding position of the current coding block in the appositive frame to make the corresponding scaling adjustment according to the position relationship of the reference image. At most, only one candidate MV is provided in the temporal domain. The candidate MV is obtained from the MV expansion of the appositive block at C0 position in the FIG. 9. When the appositive block at C0 position is not available, it will be replaced by the appositive block at C1 position.

When the Merge candidate list is not filled, the MVS in the encoded blocks HMVP list are compared with the MVS in spatial A1 and B1 in turn, and different MVS are filled in the candidate list until the candidate list is filled.

When the Merge candidate list is not filled, the first two MVS in the Merge candidate list are used to average, and first two MVS in the Merge candidate list are forward-averaged and backward-averaged. Finally the average value is filled in the Merge candidate list.

When the Merge candidate list is not yet filled, zero MV is used to fill in the Merge candidate list to the specified number.

In another embodiment, MV candidate list of Merge mode can be constructed by other methods, and there is no restriction here.

In one embodiment, some or all motion vectors are directly selected as candidate motion vectors from the candidate motion vector list constructed by the current coding block, or some or all motion vectors are selected as candidate motion vectors from the rough selected candidate motion vector list.

In the embodiment, rough selection of candidate list may comprise: making motion compensation for 6 MV in Merge candidate list; comparing the rate distortion cost (Rdcost) of luminance components based on sum of absolute transformed difference (SATD, that is, absolute sum of coefficients after hadman transform for residuals); obtaining 5 MV lists with lower cost, and constructing the Rdcost list corresponding to these 5 MVs and the index list corresponding to MV in the Merge candidate list. The mathematical relationship of Rdcost is calculated as follows:

$$Rdcost = D + \lambda * R$$

D refers to the distortion with different MV, R refers to the number of bits with different MV, and λ refers to Lagrange factor.

In one embodiment, when the result of multiplying length by width of the current coding block is greater than or equal to 64, intra frame and inter frame joint prediction of luminance can be performed. In the embodiment, the first 4 MVS among the 5 better MVS are selected as candidate MVS, and the inter frame prediction value is obtained by making inter frame prediction for the current coding block. In other embodiments, other numbers of candidate MV can be selected for inter frame prediction in other ways.

The joint intra frame prediction mode and the joint intra frame prediction value are obtained based on any one of the methods described in the above embodiments, and then the intra frame and inter frame joint prediction values of different combinations are obtained by combining the candidate inter frame prediction values and joint intra frame prediction value using any one of the methods described in the above embodiments. The different combinations refer to the combination of different candidate MVS and different joint intra frame prediction modes.

SATD is used to calculate all the values of Rdcost of intra frame and inter frame joint prediction luminance components. The Rdcost list and index list are updated by comparing the obtained values of Rdcost with those in the Rdcost list corresponding to MV in turn. When there are intra frame and inter frame joint modes in the Rdcost list, an intra frame prediction mode list is added.

The 5 best MVS and/or the combinations of intra frame and inter frame joint modes are selected carefully. Firstly, the prediction value of the current coding block is obtained according to MV or the combinations of intra frame and inter frame joint modes, and then the residual is obtained. The residual is transformed, quantized, inverse quantized and inverse transformed to obtain the reconstruction value. Finally, sum of squared error (SSE, the sum of the squares of the difference) is used to calculate and compare the Rdcost of each candidate motion vector and/or the combination of intra frame and inter frame joint mode in the candidate list. The candidate motion vector or the combination of intra frame and inter frame joint mode with the lowest cost is the best prediction method under the Merge mode. Finally, a flag syntax element is used to express whether prediction method of the combination of intra frame and inter frame joint mode is adopted, and an index syntax element is used to express the position of the motion vector in the Merge candidate list.

In the above-mentioned scheme, at least one encoded block is used to determine the joint intra frame prediction mode, or the content characteristics of the current coding block are used to determine the joint intra frame prediction mode, or the joint intra frame prediction mode is specified among multiple intra frame prediction modes. Then different intra frame prediction values are weighted to obtain the final intra frame prediction value. Finally, the intra prediction value and inter prediction value are weighted to obtain the final intra frame and inter frame joint prediction value of the current coding block. Thus, the accuracy of the prediction value can be improved, the time redundancy can be further removed and the compression rate of the inter frame coding can be improved.

Figure 10:
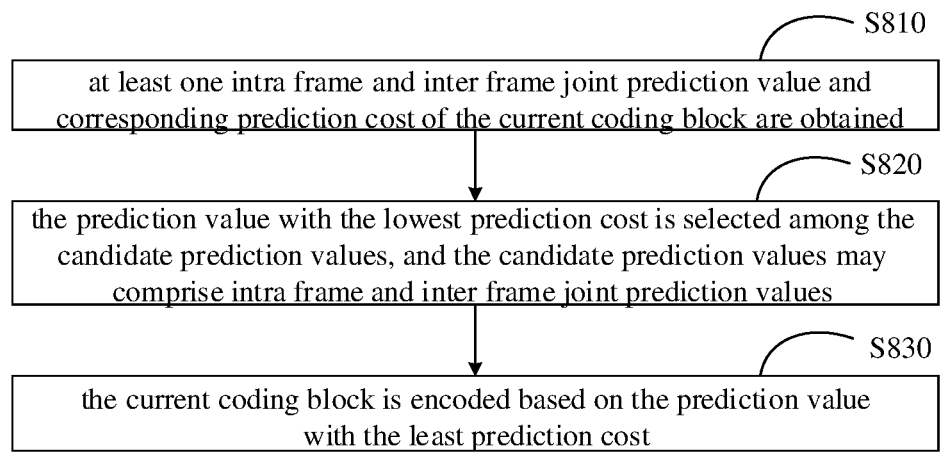
FIG. 10 is a flow chart of a coding method according to one embodiment of the present disclosure.

Referring to FIG. 10, FIG. 10 is a flow chart of the encoding method according to the embodiment of the present disclosure. The encoding method can be executed by a codec device. In the embodiment, the encoding method can include operations at blocks illustrated in FIG. 10.

At block S810, at least one intra frame and inter frame joint prediction value and corresponding prediction cost of the current coding block are obtained.

In the embodiment, the intra frame and inter frame joint prediction value is obtained based on any of the above-mentioned intra frame and inter frame joint prediction methods. Please refer to the description of the above-mentioned embodiments. The details will not be repeated here.

At block S820, the prediction value with the lowest prediction cost is selected among the candidate prediction values, and the candidate prediction values may comprise intra frame and inter frame joint prediction values.

The candidate prediction values may also include individual inter frame prediction values. Please refer to the description of the above embodiments for the calculation and selection method of the prediction cost. The details will not be repeated here.

At block S830, the current coding block is encoded based on the prediction value with the least prediction cost.

In the embodiment, the prediction value with the lowest prediction cost can be intra frame joint prediction value or individual inter frame prediction value. In different prediction modes, the coding process of the block to be coded can refer to the existing coding process corresponding to the prediction mode, and will not be repeated here.

Figure 11:
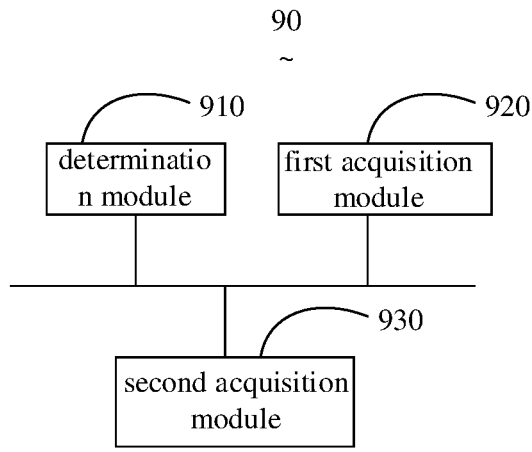
FIG. 11 is a structural diagram of an intra frame and inter frame joint prediction device according to one embodiment of the present disclosure.

Referring to FIG. 11, FIG. 11 is a structural diagram of the intra frame and inter frame joint prediction device according to the embodiment of the present disclosure. In the embodiment, the intra frame and inter frame joint prediction device 90 comprise a determination module 910, a first acquisition module 920 and a second acquisition module 930.

The determination module 910 is used to determine at least one joint intra frame prediction mode of the current coding block based on the intra frame prediction mode of at least one encoded block of the current frame, or determine at least one joint intra frame prediction mode of the current coding block based on the content characteristics of the current coding block, or take at least one first specified intra frame prediction mode as at least one joint intra frame prediction mode of the current coding block.

The first acquisition module 920 is used to obtain the joint intra frame prediction value of the current coding block based on at least one joint intra frame prediction mode.

The second acquisition module 930 is used to obtain at least one intra frame and inter frame joint prediction value based on at least one candidate motion vector and a joint intra frame prediction value of the current coding block.

In some embodiments, when there are available encoded blocks in the current frame, the determination module 910 is specifically used to select at least one available encoded block as a reference encoded block based on the size information of the current coding block, and to take the intra frame prediction mode of the reference encoded block as the joint intra frame prediction mode.

In some embodiments, when there are no available encoded blocks in the current frame, the determination module 910 is specifically used to take the second specified intra frame prediction mode as the joint prediction mode.

In some embodiments, when the width and height of the current coding block are not equal and there are available encoded blocks on the long side of the current coding block, the reference encoded block are included in at least one available encoded blocks on the long side of the current coding block.

In some embodiments, when the width and height of the current coding block are not equal, there are no available encoded blocks on the long side of the current coding block and there are available encoded blocks on the short side of the current coding block, then the reference encoded blocks are included in at least one available encoded block on the short side of the current coding block.

In some embodiments, when the width and height of the current coding block are equal and there are available encoded blocks on the long side and/or short side of the current coding block, the reference encoded blocks are included in at least one available encoded block on the long side and/or short side of the current coding block.

In some embodiments, when the width and height of the current coding block are not equal, and there are available encoded blocks on both the long side and the short side of the current coding block, the reference encoded blocks are included in at least one available encoded block on the long side and the short side of the current coding block.

In some embodiments, the joint intra frame prediction value of the current coding block is the weighted average of the reference intra frame prediction values, and each reference intra frame prediction value is obtained by intra frame prediction of the current coding block using each joint intra frame prediction mode.

In some embodiments, when the width and height of the current coding block are not equal, the reference encoded blocks are included in the available encoded blocks on the long side and short side of the current coding block. The joint intra frame prediction mode may comprise the long side intra frame prediction mode and the short side intra frame prediction mode. The long side intra frame prediction mode is the intra frame prediction mode of the available encoded blocks in the reference encoded blocks on the long side of the current coding block. The short side intra frame prediction mode is the intra frame prediction mode of available encoded blocks in the reference encoded blocks on the short side of the current coding block.

The first acquisition module 920 is specifically used to obtain the reference intra frame prediction values based on each joint intra frame prediction mode to carry out intra frame prediction on the current coding block. The reference intra frame prediction values may comprise the long side intra frame prediction values and the short side intra frame prediction values. The long side intra frame prediction values are obtained based on the long side intra frame prediction mode to carry out intra frame prediction on the current coding block. The short side intra frame prediction values are obtained based on the short side intra frame prediction mode to carry out intra frame prediction on the current coding block. The reference intra frame prediction values are used to calculate the long side statistical intra frame prediction value and the short side statistical intra frame prediction value. The long side statistical intra frame prediction value is the weighted average value of all the long side intra frame prediction values. The short side statistical intra frame prediction value is the weighted average value of all short side intra frame prediction values. The weight of the long side statistical intra frame prediction value is greater than that of the short side statistical intra frame prediction value.

In some embodiments, the intra frame and inter frame joint prediction value is the weighted average value of the candidate inter frame prediction value and the joint intra frame prediction value. The candidate inter frame prediction value is obtained by making inter frame prediction for the current coding block using the candidate motion vector. The relationship between the weight of the candidate inter frame prediction value and the weight of the joint intra frame prediction value is determined according to the source of joint intra prediction mode.

In some embodiments, when at least part of the joint intra frame prediction mode is the intra frame prediction mode of the available encoded blocks on the long side of the current coding block, the weight of the candidate inter frame prediction value is less than the weight of the joint intra frame prediction value.

In some embodiments, when the joint intra frame prediction modes are all the intra frame prediction modes of the available encoded blocks on the short side of the current coding block, the weight of the candidate inter frame prediction value is equal to the weight of the joint intra frame prediction value.

In some embodiments, when the joint intra prediction mode is the second specified intra prediction mode, the weight of the candidate inter prediction value is greater than the weight of the joint intra prediction value.

In some embodiments, when there are available encoded blocks in the current frame, the occurrence times of the intra frame prediction mode of at least one available encoded block in the current frame are counted to obtain the statistical results, and the determination module 910 is specifically used to determine the joint intra frame prediction mode based on the statistical results.

In some embodiments, when there are no available encoded blocks in the current frame, the determination module 910 is used to take the second specified intra frame prediction mode as the joint prediction mode.

In some embodiments, the determination module 910 is specifically used to select a specified number of intra frame prediction modes with the largest number of occurrences in the statistical results as the joint intra frame prediction mode.

In some embodiments, the joint intra frame prediction value of the current coding block is the weighted average value of the reference intra frame prediction values. Each reference intra frame prediction value is obtained by carrying out intra frame prediction of the current coding block using each joint intra frame prediction mode. The weight of the reference intra frame prediction values is positively correlated with the occurrence times of the corresponding joint intra frame prediction mode.

In some embodiments, the intra frame and inter frame joint prediction value is the weighted average value of the candidate inter frame prediction value and the joint intra frame prediction value. The candidate inter frame prediction value is obtained from the inter frame prediction of the current coding block using the candidate motion vector. The relationship between the weight of the candidate inter frame prediction value and the weight of the joint intra frame prediction value is determined according to the statistical results.

In some embodiments, when the first occurrence is greater than or equal to the first threshold, the weight of the candidate inter frame prediction value is less than the weight of the joint intra frame prediction value. Besides, the first occurrence is the maximum number of occurrences in the statistical result.

In some embodiments, when the number of first occurrences is less than the first threshold and greater than or equal to the second threshold, the weight of the candidate inter frame prediction value is equal to the weight of the joint intra frame prediction value.

In some embodiments, when the first occurrence is less than the second threshold or the joint intra frame prediction mode is the second specified intra frame prediction mode, the weight of the candidate inter frame prediction value is greater than the weight of the joint intra frame prediction value.

In some embodiments, the second specified intra frame prediction mode is Planar mode.

In some embodiments, the content characteristics of the current coding block are used to determine at least one joint intra frame prediction mode of the current coding block. The determination module 910 is specifically used to obtain the texture direction features of the current coding block, and at least one intra frame prediction mode corresponding to the texture direction is taken as the joint intra frame prediction mode.

In some embodiments, the content characteristics of the current coding block are used to determine at least one joint intra frame prediction mode of the current coding block. The determination module 910 is specifically used to obtain multiple intra frame prediction values and corresponding prediction costs of the current coding block, and the intra frame prediction mode corresponding to the intra frame prediction value with the lowest prediction cost is taken as the joint intra frame prediction mode.

In some embodiments, the preferred intra frame prediction mode and at least one adjacent intra frame prediction mode are taken as the joint intra frame prediction mode. The preferred intra frame prediction mode is the intra frame prediction mode corresponding to the intra frame prediction value with the lowest prediction cost. The adjacent intra frame prediction mode is the intra frame prediction mode on both sides of the preferred intra frame prediction mode. When the preferred intra frame prediction mode is Planar mode, the adjacent intra frame prediction mode is DC mode.

In some embodiments, at least one joint intra frame prediction mode of the current coding block is determined based on the content characteristics of the current coding block. The joint intra frame prediction value of the current coding block is the weighted average value of the reference intra frame prediction values, and each reference intra frame prediction value is obtained by carrying out intra frame prediction of the current coding block using each joint intra frame prediction mode. The weight of reference intra frame prediction value is positively correlated with the corresponding joint intra frame prediction mode and the similarity of the content features of the current coding block.

In some embodiments, the determination module 910 is specifically used to take at least one first specified intra frame prediction mode as at least one joint intra frame prediction mode of the current coding block. The first specified intra frame prediction mode is an intra frame prediction mode other than the Planar mode.

In some embodiments, multiple first specified intra frame prediction modes are taken as at least one joint intra frame prediction mode of the current coding block. The joint intra frame prediction value of the current coding block is the weighted average value of the reference intra frame prediction values, and each reference intra frame prediction value is obtained from intra frame prediction of the current coding block using each joint intra frame prediction mode.

In some embodiments, the intra frame and inter frame joint prediction value is the weighted average value of the candidate inter frame prediction value and the joint intra frame prediction values, and the candidate inter frame prediction value are obtained by carrying out inter frame prediction of the current coding block using the candidate motion vector.

In some embodiments, at least one candidate motion vector is part or all of the motion vectors in the candidate motion vector list constructed by the current coding block, or some or all of the motion vectors in the candidate motion vector list after rough selection.

The intra frame and inter frame joint prediction device can be used to perform the intra frame and inter frame joint prediction method described above. Please refer to the description of the above embodiments for the intra frame and inter frame joint prediction method. The details will not be repeated here.

Figure 12:
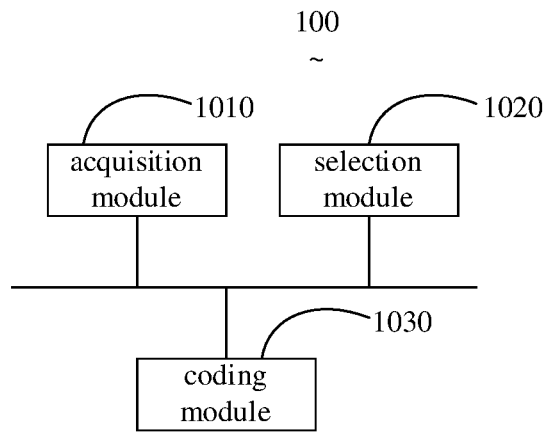
FIG. 12 is a structural diagram of a encoding device according to one embodiment of the present disclosure.

Referring to FIG. 12, FIG. 12 is a structural diagram of the encoding device according to the embodiment of the present disclosure. In the embodiment, an encoding device 100 is provided. The encoding device 100 comprises an acquisition module 1010, a selection module 1020, and a coding module 1030. The acquisition module 1010 is used to obtain at least one intra frame and inter frame joint prediction value and corresponding prediction cost of the current coding block. The intra frame and inter frame joint prediction value is obtained based on any of the intra frame and inter frame joint prediction method mentioned above. The selection module 1020 is used to select the prediction value with the lowest prediction cost among the candidate prediction values, and the candidate prediction values may comprise the intra frame and inter frame joint prediction value. The coding module 1030 is used to encode the current coding block based on the prediction value with the minimum prediction cost.

The encoding device can be used to perform the encoding method described above. Please refer to the description of the above embodiments.

Figure 13:
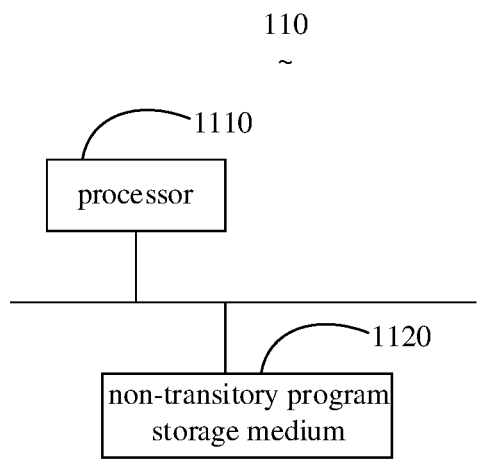
FIG. 13 is a schematic diagram of a codec device according to one embodiment of the present disclosure.

Referring to FIG. 13, FIG. 13 is a schematic diagram of the structure of the codec device according to the embodiment of the present disclosure. In the embodiment, the codec device 110 comprises a processor 1110 and a non-transitory program storage medium 1120. The processor is coupled with the non-transitory program storage medium 1120. The non-transitory program storage medium 1120 is used to store a program, and the processor 1110 is used to execute a program to realize the intra frame and inter frame joint prediction method and coding method of any of the above embodiments.

The codec 110 can be computer device 110. The processor 1110 can also be called as a central processing unit (CPU). The processor 1110 can be an integrated circuit chip with signal processing capability. The processor 1110 may also be a general-purpose processor, digital signal processor (DSP), application specific integrated circuit (ASIC), field programmable gate array (FPGA) or other programmable logic devices, discrete gate, transistor logic devices, and discrete hardware components. The general-purpose processor can be a microprocessor or any conventional processor, etc.

Figure 14:
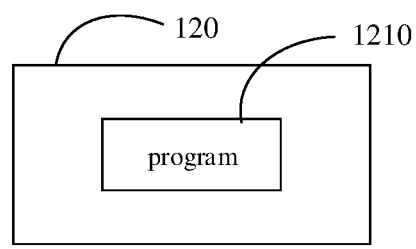
FIG. 14 is a structural diagram of a device with storage function according to one embodiment of the present disclosure.

Refer to FIG. 14, FIG. 14 is the structural diagram of the device with storage function according to the embodiment of the present disclosure. In the embodiment, the device 120 with the storage function stores program 1210. When the program 1210 is executed, the intra frame and any of the inter frame joint prediction method and coding method mentioned above embodiments can be realized.

The program 1210 can be stored in the device 120 with the storage function in the form of a software product, including instructions for a device or processor to perform all or part of the steps of the all embodiments of the present disclosure.

The device 120 with storage function is a medium used to store some discontinuous physical quantity in computer memory. The device 120 with the storage function may comprise a USB flash disk, a mobile hard disk, a read-only memory (ROM), a random access memory (RAM), a disk or a CD, and other media that can store program code.

It should be understood, that the system, device and method disclosed in several embodiments provided by the present disclosure may be implemented in other ways. The above-described implementations of the device are schematic. For example, the division of the module or unit is a logical function division, which can be implemented in a different way (e.g. multiple units or components may be combined or integrated into another system, or some features may be ignored, or not performed). The illustrated or discussed coupling (direct coupling or communication connections) among each other may be through the indirect coupling or the communication connection of some interfaces, devices, or units. The coupling may be electrical, mechanical or of other forms.

Units illustrated as separate components may or may not be physically separate. Components illustrated as units may or may not be physical units, i.e. may be located in a place, or may also be distributed on a plurality of network units. Some or all of the units may be selected to achieve the purposes of the present embodiment according to actual needs.

In addition, each functional unit in the embodiments of the present disclosure may be integrated in a single processing unit, or may be individually a physical unit, respectively; or two or more units may be integrated in a single unit. The above integrated units may be implemented either in a form of hardware or in a form of software functional units.

When the integrated unit is implemented as a software functional unit and sold or used as a standalone product, the integrated unit may be stored in a computer-readable storage medium. The technical scheme of the present disclosure essentially, or part of the technical scheme that contributes to the prior art, or all or part of the technical scheme, may be embodied in the form of a software product. The computer software product may be stored in a device having a storage function. The computer software product may include instructions to enable a computer device (e.g., a personal computer, a server, or a network device, etc.) or a processor to perform all or some of the operations of the method described in the embodiment according to the present disclosure. The device having a storage function may include: a USB flash drive, a removable hard drive, a read-only memory (ROM), a random access memory (RAM), a diskette, a CD-ROM, a server or other media capable of storing program codes.

The above description is for the purpose of illustrating implementations of the present disclosure, but not to limit the scope of the present disclosure. Any equivalent structural or process transformation performed based on the drawings and the specification of the present disclosure, applied directly and indirectly in other related art, should be within the scope of the present disclosure.

What is claimed:

1. An intra frame and inter frame joint prediction method, the method comprising:
   determining at least one joint intra frame prediction mode of current coding block;
   obtaining a joint intra frame prediction value of the current coding block based on the at least one joint intra frame prediction mode, wherein the joint intra frame prediction value of the current coding block is a weighted average value of reference intra frame prediction values, and each reference intra frame prediction value is obtained based on each joint intra frame prediction mode to make intra frame prediction for the current coding block; and
   obtaining at least one intra frame and inter frame joint prediction value based on at least one candidate motion vector (MV) and the joint intra frame prediction value of the current coding block.

2. The method of claim 1, wherein the determining at least one joint intra frame prediction mode comprises determining the at least one joint intra frame prediction mode of current coding block based on intra frame prediction mode of at least one encoded block of current frame;
   the determining the at least one joint intra frame prediction mode of current coding block based on intra frame prediction mode of at least one encoded block of current frame, comprises:
   in response to existence of available encoded blocks in the current frame, selecting at least one available encoded block as reference encoded block with size information of the current coding block, and taking the intra frame prediction mode of the reference encoded block as the joint intra frame prediction mode; and in response to non-existence of the available encoded blocks in the current frame, taking second specified intra frame prediction mode as the joint intra frame prediction mode.

3. The method of claim 2, wherein in response to width and height of the current coding block being not equal and the existence of the available encoded blocks on long side of the current coding block, the reference encoded blocks comprise the at least one available encoded block on the long side of the current coding block;
in response to width and height of the current coding block being not equal, the non-existence of the available encoded blocks on the long side of the current coding block and the existence of the available encoded blocks on short side of the current coding block, the reference encoded blocks comprise the at least one available encoded block on the short side of the current coding block; and
in response to width and height of the current coding block being equal, and the existence of the available encoded blocks on the long side or short side of the current coding block, the reference encoded blocks comprise the at least one available encoded block on the long side or short side of the current coding block.

4. The method of claim 2, wherein in response to being not equal width and height of the current coding block and the existence of the available encoded blocks on both the long side and the short side of the current coding block, the reference encoded blocks comprise the at least one available encoded block on the long side and the short side of the current coding block.

5. The method of claim 3, wherein in response to being not equal the width and height of the current coding block, the reference encoded blocks comprise the available encoded blocks on the long side and the short side of the current coding block, the joint intra frame prediction modes comprise long side intra frame prediction mode and short side intra frame prediction mode, the long side intra frame prediction mode is an intra frame prediction mode of the available encoded blocks on the long side of the current coding block among the reference encoded blocks, the short side intra frame prediction mode is an intra frame prediction mode of the available encoded blocks on the short side of the current coding block among the reference encoded blocks;
wherein the obtaining joint intra frame prediction value of the current coding block comprises:
using each joint intra prediction mode to make intra prediction for the current coding block to obtain the reference intra prediction values, wherein the reference intra frame prediction values comprise long side intra frame prediction values and short side intra frame prediction values, the long side intra frame prediction values are obtained based on the long side intra frame prediction mode to make intra frame prediction for the current coding block, and the short side intra frame prediction values are obtained based on the short side intra frame prediction mode to make intra frame prediction for the current coding block;
calculating long side statistical intra frame prediction value and short side statistical intra frame prediction value based on the reference intra frame prediction values, wherein the long side statistical intra frame prediction value is the weighted average value of all the long side intra frame prediction value and the short side statistical intra frame prediction value is the weighted average value of all the short side intra frame prediction values; and
calculating weighted average value of the long side statistical intra prediction value and the short side statistical intra prediction value as the joint intra prediction value, wherein the weight of long side statistical intra frame prediction value is greater than that of short side statistical intra frame prediction value.

6. The method of claim 3, wherein the intra frame and inter frame joint prediction value is weighted average value of candidate inter frame prediction value and the joint intra frame prediction value, the candidate inter frame prediction value is obtained by making inter frame prediction of the current coding block using the candidate MV, the relationship between the weight of the candidate inter frame prediction value and the weight of the joint intra frame prediction value is determined according to the source of the joint intra frame prediction mode.

7. The method of claim 6, wherein in response to at least part of the joint intra frame prediction mode being the intra frame prediction mode of the available encoded blocks on the long side of the current coding block, the weight of the candidate inter frame prediction value is less than the weight of the joint intra frame prediction value;
in response to the joint intra frame prediction mode being the intra frame prediction mode of the available encoded blocks on the short side of the current coding block, the weight of the candidate inter frame prediction value is equal to the weight of the joint intra frame prediction value; and
in response to the joint intra frame prediction mode being the second specified intra frame prediction mode, the weight of the candidate inter frame prediction value is greater than the weight of the joint intra frame prediction value.

8. The method of claim 1, wherein the determining at least one joint intra frame prediction mode of current coding block comprises:
in response to the existence of the available encoded blocks in the current frame, counting occurrence times of the intra frame prediction mode of at least one available encoded blocks in the current frame to obtain statistical results, and determining the joint intra frame prediction mode by the statistical results; and
in response to the non-existence of the available encoded blocks in the current frame, taking the second specified intra frame prediction mode as the joint prediction mode.

9. The method of claim 8, wherein the joint intra frame prediction value of the current coding block is the weighted average value of the reference intra frame prediction values, each reference intra frame prediction value is obtained based on each joint intra frame prediction mode to make intra frame prediction for the current coding block, and the weight of the reference intra frame prediction values is positively correlated with at least one of the occurrence times of the corresponding joint intra frame prediction mode and similarity of content features of the current coding block.

10. The method of claim 8, wherein the intra frame and inter frame joint prediction value is the weighted average value of candidate inter frame prediction value and the joint intra frame prediction value, the candidate inter frame prediction value is obtained by making the inter frame prediction for the current coding block using the candidate MV, and relationship between the weight of the candidate inter frame prediction value and the weight of the joint intra frame prediction value is determined according to the statistical results.

11. The method of claim 10, wherein in response to first occurrence greater than or equal to first threshold, the weight of the candidate inter frame prediction value is less than the weight of the joint intra frame prediction value, and the first occurrence number is the maximum number of occurrences in the statistical results;

in response to the first occurrence less than the first threshold and greater than or equal to second threshold, the weight of the candidate inter frame prediction value is equal to the weight of the joint intra frame prediction value; and in response to the first occurrence less than the second threshold or the joint intra frame prediction mode being the second specified intra frame prediction mode, the weight of the candidate inter frame prediction value is greater than that of the joint intra frame prediction value.

12. A codec device, comprising: a processor and a non-transitory program storage medium coupled to the processor, wherein the non-transitory program storage medium is configured to store a program, and the processor is configured to execute the program to perform:

determining at least one joint intra frame prediction mode of current coding block;

obtaining a joint intra frame prediction value of the current coding block based on the at least one joint intra frame prediction mode, wherein the joint intra frame prediction value of the current coding block is a weighted average value of reference intra frame prediction values, and each reference intra frame prediction value is obtained based on each joint intra frame prediction mode to make intra frame prediction for the current coding block; and obtaining at least one intra frame and inter frame joint prediction value based on at least one candidate MV and the joint intra frame prediction value of the current coding block.

13. A non-transitory storage medium storing instructions, when executed, causing a processor to perform:

determining at least one joint intra frame prediction mode of current coding block;

obtaining a joint intra frame prediction value of the current coding block based on the at least one joint intra frame prediction mode, wherein the joint intra frame prediction value of the current coding block is a weighted average value of reference intra frame prediction values, and each reference intra frame prediction value is obtained based on each joint intra frame prediction mode to make intra frame prediction for the current coding block; and obtaining at least one intra frame and inter frame joint prediction value based on at least one candidate MV and the joint intra frame prediction value of the current coding block.

\* \* \* \* \*